US009900173B2

(12) United States Patent
Robinson

(10) Patent No.: US 9,900,173 B2
(45) Date of Patent: Feb. 20, 2018

(54) PERSONALIZED AMBIENT TEMPERATURE MANAGEMENT

(71) Applicant: ECHOSTAR UK HOLDINGS LIMITED, Keighley, West Yorkshire (GB)

(72) Inventor: David Robinson, Keighley (GB)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 789 days.

(21) Appl. No.: 14/459,517

(22) Filed: Aug. 14, 2014

(65) Prior Publication Data
US 2016/0047565 A1    Feb. 18, 2016

(51) Int. Cl.
*F24F 11/00* (2006.01)
*H04L 12/28* (2006.01)
*G05D 23/19* (2006.01)

(52) U.S. Cl.
CPC ...... *H04L 12/2803* (2013.01); *F24F 11/0034* (2013.01); *G05D 23/1928* (2013.01); *F24F 2011/0035* (2013.01)

(58) Field of Classification Search
None
See application file for complete search history.

(56) References Cited

U.S. PATENT DOCUMENTS 8,674,816 B2 * 3/2014 Trundle ............... F24F 11/0086
340/12.53
8,718,825 B2 * 5/2014 George ................. G05D 22/02
236/44 C
9,595,070 B2 * 3/2017 Matsuoka ............. G06Q 50/06
9,638,431 B2 * 5/2017 Frader-Thompson F24F 11/0001
2008/0256967 A1    10/2008 Errington
(Continued)

FOREIGN PATENT DOCUMENTS

DE    10 2012 003311 A1    10/2012

OTHER PUBLICATIONS

Shein et al. "Study of Temperature Control using Cyber-physical System Approach in Home Environment", 2013 IEEE, pp. 78-83.*
(Continued)

*Primary Examiner* — Van Nguyen
(74) *Attorney, Agent, or Firm* — Kilpatrick Townsend & Stockton LLP

(57) ABSTRACT

Systems, methods, and apparatus for automation control for personalized ambient temperature management are disclosed. First input corresponding to a first set of sensors may be processed. A location of a first occupant of a home may be determined based on the first input. Second input corresponding to a second set of sensors may be processed. A first temperature in the location may be determined based on the second input corresponding to the second set of one or more sensors. A first state of the first occupant in the location may be determined based on third input corresponding to the first set of sensors or corresponding to a third set of sensors. An adjustment may be determined based on the location, the first temperature, and the first state of the first occupant. One or more components of the home may be caused to adjust based on the adjustment.

17 Claims, 7 Drawing Sheets

(56) References Cited

U.S. PATENT DOCUMENTS

| | | |
|---|---|---|
| 2012/0172027 A1 | 7/2012 | Partheesh et al. |
| 2013/0073094 A1* | 3/2013 | Knapton .............. F24F 11/0034 700/278 |
| 2013/0234840 A1* | 9/2013 | Trundle ............... F24F 11/0086 340/12.53 |
| 2014/0156088 A1 | 6/2014 | Li et al. |

OTHER PUBLICATIONS

Popa et al. "Remote Temperature Monitoring and Regulating System for Indoor Locations", 2009 IEEE, pp. 235-240.*
Lu et al. "The Smart Thermostat: Using Occupancy Sensors to Save Energy in Homes", 2010 ACM, 14 pages.*
International Search Report and Written Opinion for PCT/EP2015/067386 dated Oct. 2, 2015, 9 pages.
International Preliminary Report on Patentability for PCT/EP2015/067386 dated Feb. 14, 2017, 6 pages.

* cited by examiner

PERSONALIZED AMBIENT TEMPERATURE MANAGEMENT

BACKGROUND

The present disclosure relates in general to home automation, and, more specifically, but not by way of limitation, to systems, methods, and apparatus for facilitating personalized ambient temperature management.

Current control and monitoring systems for temperature control within homes are rather limited and inflexible. However, as value, use, and demand corresponding to home automation continue to increase, consumers have come to expect more personalized and useful features. Companies are expected to compete to provide personalized and more flexible product and service offerings.

There is a need in the home automation space to provide enhanced temperature control features tailored to needs of individuals.

BRIEF SUMMARY

Certain embodiments of the present disclosure relate in general to home automation, and, more specifically, but not by way of limitation, to systems, methods, and apparatus for facilitating personalized ambient temperature management.

In one aspect, a method for automation control for personalized ambient temperature management is disclosed. The method may include any one or combination of the following. First input corresponding to a first set of one or more sensors communicatively coupled to the control device may be processed. A location of a first occupant of a home may be determined by the control device based at least in part on the first input corresponding to the first set of one or more sensors. Second input corresponding to a second set of one or more sensors communicatively coupled to the control device may be processed by the control device. A first temperature in the location may be determined by the control device based at least in part on the second input corresponding to the second set of one or more sensors. A first state of the first occupant in the location may be determined by the control device based at least in part on third input corresponding to the first set of one or more sensors or corresponding to a third set of one or more sensors. An adjustment may be determined by the control device based at least in part on the location, the first temperature, and the first state of the first occupant. One or more components of the home may be caused by the control device to adjust based at least in part on the adjustment.

In another aspect, a system for automation control for personalized ambient temperature management is disclosed. The system may include a control device configured to communicatively couple to a first set of one or more sensors, a second set of one or more sensors, and one or more components of a home. The control device may include one or more processors and memory communicatively coupled with and readable by the one or more processors and having stored therein processor-readable instructions which, when executed by the one or more processors, cause the one or more processors to perform any one or combination of the following. First input corresponding to the first set of one or more sensors communicatively coupled to the control device may be processed. A location of a first occupant of a home may be determined based at least in part on the first input corresponding to the first set of one or more sensors. Second input corresponding to the second set of one or more sensors communicatively coupled to the control device may be processed. A first temperature in the location may be determined based at least in part on the second input corresponding to the second set of one or more sensors. A first state of the first occupant in the location may be determined based at least in part on third input corresponding to the first set of one or more sensors or corresponding to a third set of one or more sensors. An adjustment may be determined based at least in part on the location, the first temperature, and the first state of the first occupant. At least one component of the one or more components of the home may be caused to adjust based at least in part on the adjustment.

In yet another aspect, disclosed is one or more non-transitory, machine-readable media having machine-readable instructions thereon which, when executed by one or more processing devices, facilitates automation control for personalized ambient temperature management, causing the one or more processing devices to perform any one or combination of the following. First input corresponding to a first set of one or more sensors may be processed. A location of a first occupant of a home may be determined based at least in part on the first input corresponding to the first set of one or more sensors. Second input corresponding to a second set of one or more sensors may be processed. A first temperature in the location may be determined based at least in part on the second input corresponding to the second set of one or more sensors. A first state of the first occupant in the location may be determined based at least in part on third input corresponding to the first set of one or more sensors or corresponding to a third set of one or more sensors. An adjustment may be determined based at least in part on the location, the first temperature, and the first state of the first occupant. One or more components of the home may be caused to adjust based at least in part on the adjustment.

In some embodiments, the first state of the first occupant may correspond to remaining in the location for a time period, and the time period may be determined to satisfy a first threshold. The causing the one or more components of the home to adjust may be contingent on the threshold being satisfied. In some embodiments, one or more preferences associated with the first occupant may be identified. The adjustment may be determined to meet user constraints based at least in part on the one or more preferences.

In some embodiments, a presence of a second occupant of the home may be identified. The determining of the adjustment may be based in part on the presence of the second occupant and a set of rules for multi-occupant situations. In some embodiments, presentation of one or more user-selection options via one or more notification interfaces may be caused. One or more user selections corresponding to the one or more user-selection options may be processed. The determining of the adjustment may be based in part on the one or more user selections.

In some embodiments, one or more outdoor conditions may be determined. The determining of the adjustment may be based in part on the one or more outdoor conditions. In some embodiments, the first state of the first occupant in the location may include a proximity to a heat source or a heat sink.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The present disclosure is directed to systems and methods for personalized ambient temperature management. In general, people have varying preferences for ambient temperature. Some have preferences for relatively cooler temperatures, some for relatively warmer temperatures. In addition to general personal preferences, personal comfort levels oftentimes change depending on any one or combination of: which room or zone an individual is in; how many individuals are present; where within a particular room or zone an individual is; proximity of an individual to a source of heat or cool air; times of day; outdoor temperatures; whether an individual has recently come indoors; how long an individual has been in a particular room or zone; and/or the like. In accordance with certain embodiments of the present disclosure, Various embodiments will now be discussed in greater detail with reference to the accompanying figures, beginning with FIG. 1.

Figure 1:
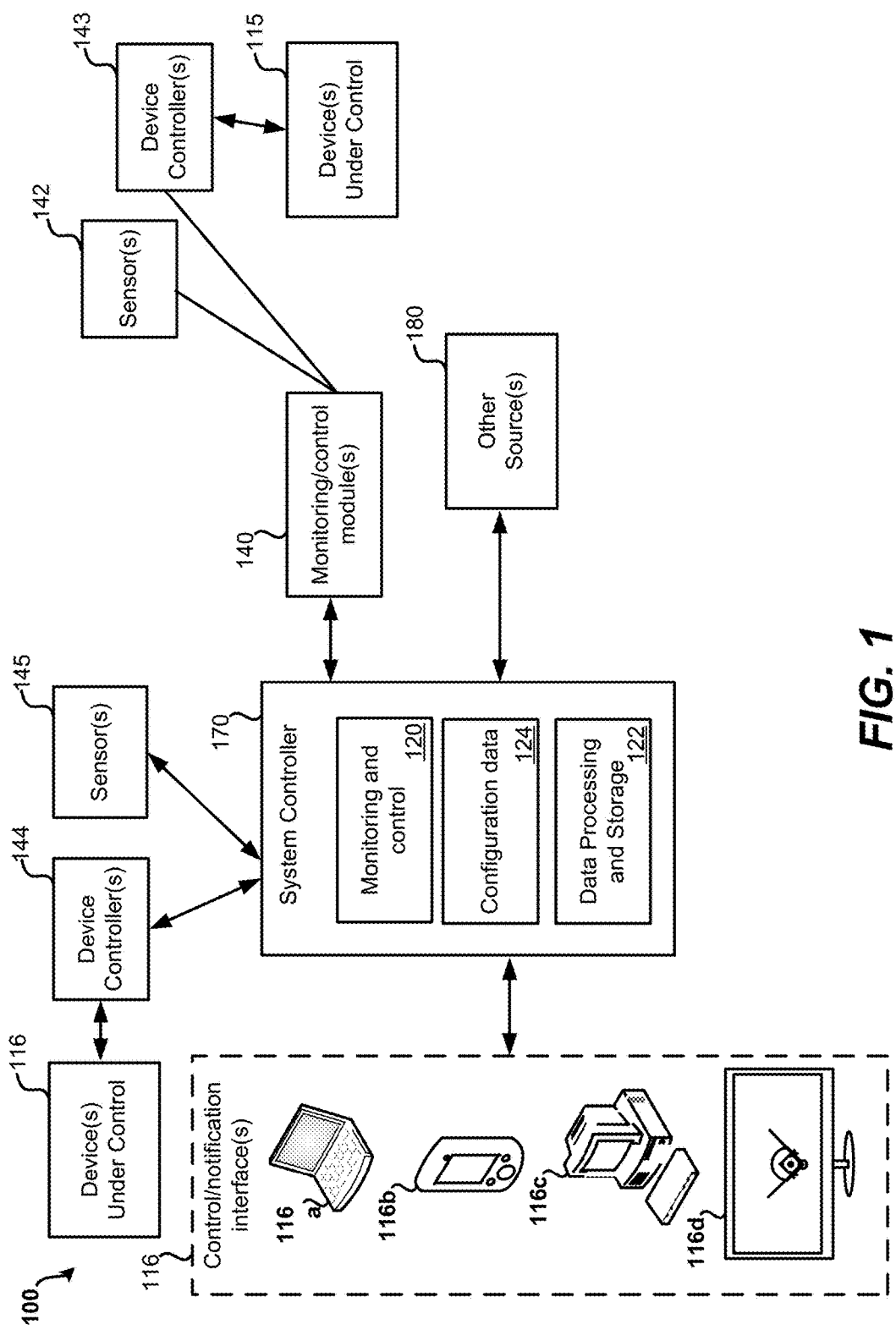
FIG. 1 illustrates a diagram of an overview of an embodiment of a system 100 to facilitate personalized ambient temperature management, in accordance with certain embodiments of present disclosure.

FIG. 1 illustrates a diagram of an overview of an embodiment of a system 100 to facilitate personalized ambient temperature management, in accordance with certain embodiments of present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific.

The system 100 may correspond to certain embodiments for home monitoring and control. The system 100 may include a system controller 170. The system controller 170 may be configured to manage one or more other components of the system that communicatively coupled to the system controller 170 via any suitable means, including wired and/or wireless connections.

The system controller 170 may be communicatively coupled to one or more control and/or notification interfaces 116. In some embodiments, one or more interfaces 116 may be capable of user notification, showing the status, configuration data, and/or the like. The one or more interfaces 116 may be devices that are directly or indirectly connected to the system controller 170 and may receive information, such as notifications, from the system controller 170. In various embodiments, the interfaces 116 may include one or more devices such as laptops 116*a*, mobile phones 116*b*, PCs 116*c*, televisions/monitors 116*d*, television receivers/set-top boxes, tablets, and/or any suitable computing system or device.

In various embodiments, the system controller 170 may be included in a television receiver, set-top box (which may include a television receiver, in some embodiments), a television (which may include a television receiver, in some embodiments), or another household device. The television receiver may be directly or indirectly coupled to one or more display devices 116*d*, such as a television or a monitor. The system controller 170 may provide a link if necessary between the communication protocol used by the device controllers 143, 144 and the communication protocol used by an interface 116. In some embodiments, this may be a bridge between Zigbee and Wi-Fi, for example.

The system controller 170 may provide a user interface (e.g., via interface 116) to allow for output of information to a user and for input from user with one or more user-selectable options. In various embodiments, an end-user interface may include providing one or more display screens that may each include one or more user interface elements.

An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like.

A control interface 116 may include a computing device configured with a control application. In some embodiments, control may be allowed from multiple devices around the home interfacing to the system controller 170. With some embodiments, the system 100 may also allow control from outside of the home, in which case control is likely to be routed by way of servers in the cloud by way of a cloud control interface 116.

The system controller 170 may be configured to receive readings from one or more sensors and/or sensor systems 142, 145. The system controller 170 may be configured to provide signals for controlling one or more device controllers 143, 144, which may be control units and/or systems. The device controllers 143, 144 may be integrated with, or otherwise communicatively coupled to, corresponding devices under control 115, 116.

In certain embodiments, the system controller 170 may include a monitoring and control module 120. In some embodiments, the system controller 170 may be directly connected or coupled to one or more control units 144 and/or sensors 145. Sensors and control units may be wired or wirelessly coupled to the system controller 170. Sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

In some embodiments, the system 100 may include one or more monitoring/control modules 140 which could be external to the system controller 170. In some embodiments, the system controller 170 may interface to one or more sensors and control units via one or more monitoring/control modules 140. The external monitoring/control modules 140 may be wired or wirelessly coupled to the system controller 170. In some embodiments, the monitoring/control module 140 may connect to the system controller 170 via a communication port such as a USB port, serial port, and/or the like. In some embodiments, the monitoring/control module 140 may connect to the system controller 170 via a wireless communication protocol such as Wi-Fi, Bluetooth, Z-Wave, ZigBee, and/or the like. The external monitoring/control module may include a separate device that may be positioned near the system controller 170 (e.g., in embodiments where a television receiver includes the system controller 170) or may be in a different location, remote from the system controller 170.

Monitoring and control modules 120, 140 may be coupled to components such as sensors 142, 145. Sensors 142, 145 may include any one or combination of temperature, humidity, sound, proximity, field, electromagnetic, magnetic sensors, cameras, infrared detectors, motion sensors, pressure sensors, smoke sensors, fire sensors, water sensors, and/or the like. In some embodiments, one or more sensors 142, 145 may be part of a television receiver or may be separate but communicatively coupled to a television receiver (via wired and/or wireless communication channel(s)). In some embodiments, one or more sensors 142, 145 may include one or more cameras configured to have a field of view that may detect one or more individuals in proximity to the one or more sensors 142, 145. In some embodiments, the one or more sensors 142, 145 may be configured to capture images and/or other indicia of occupant states, such as any one or combination of occupant distinguishing, facial features, facial recognition, a position of the occupant's eyes, a occupant's gaze, a direction in which the occupant's eyes are looking, a position of the occupant's head, eyes movements, gestures, other occupant movements, and/or the like.

In some embodiments, monitoring and control modules 120, 140 may be coupled components such as control units. Control units may include any number of switches, solenoids, solid state devices and/or the like for controlling HVAC systems, turning on/off electronics, heating elements, cooling elements, appliances, and/or the like. For example, in some embodiments, a control unit may be a device that plugs in to an electrical outlet of a home, and other devices, such as an appliance, may be plugged into the device. The device may be controlled remotely to enable or disable electricity to flow to the appliance.

One or more of sensors 142, 145 may be part of other devices and/or systems. For example, one or more sensors 142, 145 may be part of a mobile device such as a smartphone. The telemetry readings of the sensors 142, 145 may be accessed through a wireless communication interface such as a Bluetooth connection from the smartphone. As another example, temperature sensors 142, 145 may be part of a heating and ventilation system of a home. The readings of the sensors 142, 145 may be accessed via a communication interface of the heating and ventilation system. As yet another example, motion sensors 142, 145 may be part of a security system of a home, and the motion detection input may be gathered via a communication interface of the heating and ventilation system.

One or more of the control units 143, 144 may be part of other devices and/or systems 115, 116. A control unit 143, 144 may be part of a heating and/or cooling system, an appliance, and/or another electric or electronic device. In some embodiments, the control units 143, 144 of a system may be controlled via a communication or control interface of the system. For example, the HVAC temperature setting may be configurable and/or controlled via a communication interface of the air conditioner and/or heating unit. In some embodiments, one or more of the control units 143, 144 may be able to regulate current and voltage to device under control 115, 116. The control units 143, 144 may be individually identifiable.

One or more of the sensors 142, 145 and/or control units 143, 144 may be combined into assemblies or units with multiple sensing capabilities and/or control capabilities. A single module may include, for example a temperature sensor and a motion sensor, another module may include a light sensor and power or control unit, etc.

During operation of the system 100, readings from the sensors may be collected, stored, and/or analyzed in the system controller 170. In certain embodiments, analysis of the sensors and control of the control units may be determined with configuration data 124 stored in the system controller 170. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time-based analysis to determine trends. For other applications, sensor analysis may include monitoring sensor readings to determine if a threshold value of one or more sensor readings has been reached.

The function of the system 100 may be determined by loading and/or identifying configuration data for an application. In some embodiments, the system 100 may be configured for more than one monitoring or control operation by selecting or loading the appropriate configuration data. Configuration data may define monitoring operations, reactive measures, activation constraints for components of the system, and/or the like.

Readings processed by the monitoring and control modules 120, 140 may be logged and analyzed by the data processing and storage module 122. The data processing and storage 122 module may analyze the received data and generate control signals, schedules, and/or sequences for controlling components. The data processing and storage module 122 may, for example, receive sensor data from temperature sensors, motion sensors, location sensors, light sensors, and/or the like.

In some embodiments, system controller 170 may include the option for inputs from one or more other sources 180. The one or more other sources 180 could include any suitable sensor or other data source, which could be network-accessible, such as a service provider or private/public data source. For example, in some embodiments, a service provider or other data source may push indications of local outside temperature to the system controller 170. Alternatively or additionally, the system controller 170 may pull indications of local outside temperature from a service provider or other data source. As another example, in some embodiments, a service provider or other data source may facilitate locating a user of a mobile communication device, for example, by use GPS coordinates, cellular tower triangulation techniques, Wi-Fi-based location information, carrier-provided location information, and/or other location determination systems to identify a location of the mobile communication device and/or that the user is currently using the mobile communication device. Any suitable data may be acquired by the system controller 170 one or more other sources 180.

Figure 2:
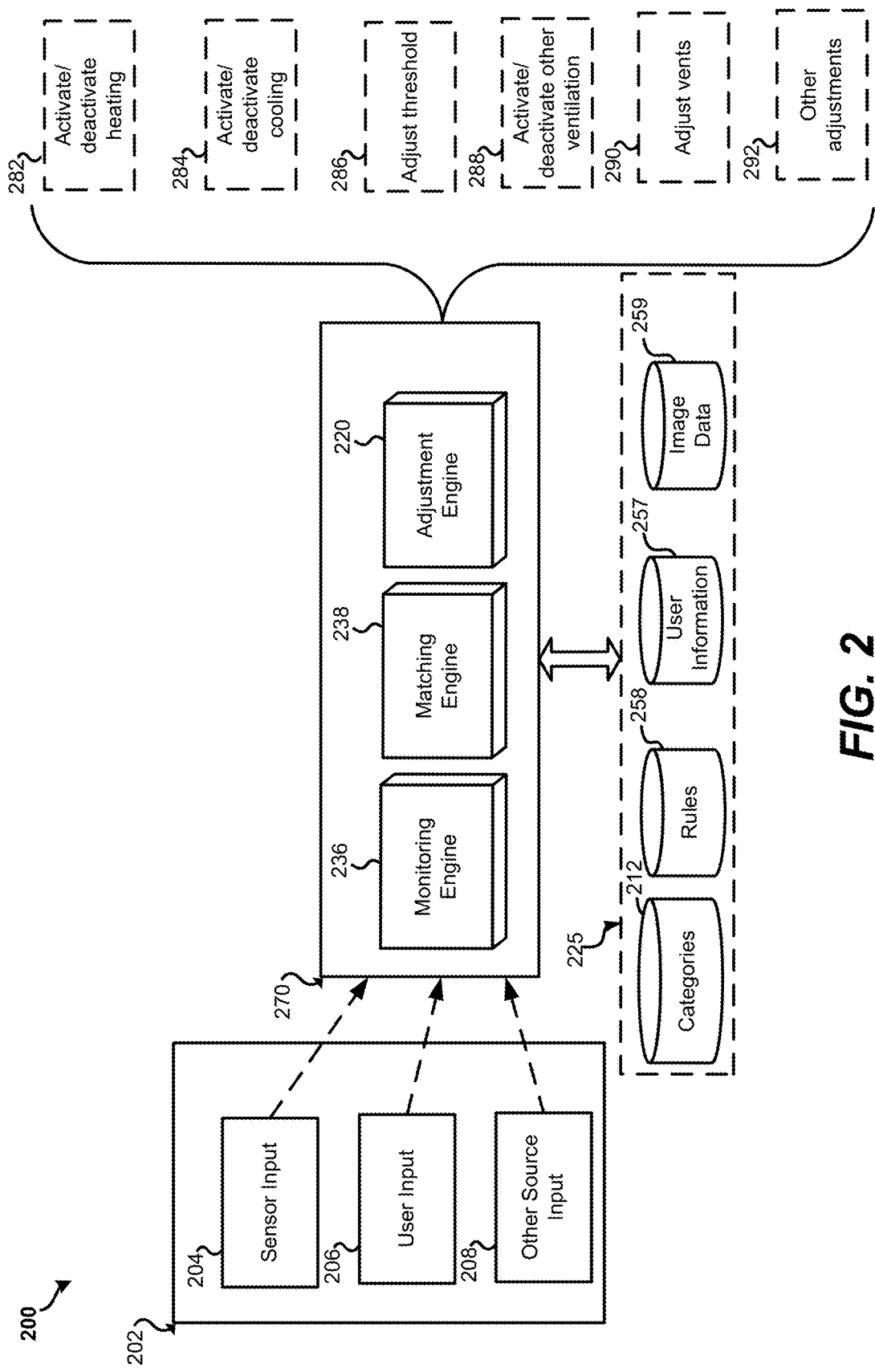
FIG. 2 illustrates a subsystem to facilitate personalized ambient temperature management, in accordance with certain embodiments of the present disclosure.

FIG. 2 illustrates a subsystem 200 to facilitate personalized ambient temperature management, in accordance with certain embodiments of the present disclosure. In some embodiments, the subsystem 200 may correspond to aspects of the system 100. While the subsystem 200 is illustrated as being composed of multiple components, it should be understood that the subsystem 200 may be broken into a greater number of components or collapsed into fewer components. Each component may include any one or combination of computerized hardware, software, and/or firmware.

As depicted, the subsystem 200 includes a system control engine 270, which may be included in the system controller 170 and may executed by one or more processors of the system controller 170 in certain embodiments. The system control engine 270 may be communicatively coupled with interface components and communication channels (which may take various forms in various embodiments as disclosed herein) configured to receive adjustment input 202.

As depicted, the adjustment input 202 may include sensor input 204. The subsystem 200 may process sensor input 204 and analyze the sensor input 204 to manage ambient temperature. The sensor input 204 may be captured by the sensors 143, 145 disclosed herein. The control engine 270 may include a monitoring engine 236 configured to monitor the adjustment input 202 for any suitable aspects pertaining to individuals in the home. For example, the monitoring engine 236 may process information enabling identification of occupants and occupant states. In some embodiments, the monitoring engine 236 may correspond to the monitoring and control module 120.

The adjustment input 202 may include user input 206. The user input 206 may include real-time user control via a user interface (e.g., one or more interfaces 116). The user input 206 may include previously acquired user preferences. One or more storage repositories 225 (which could correspond to data storage 122, in some embodiments) may store one or more user profiles 257.

The adjustment input 202 may include other source input 208, which could correspond to input from one or more other sources 180. As disclosed herein, other source input 208 may include any suitable sensor input or other data source input. Such input could include data from a service provider or private/public data source, such as data regarding local outside temperature, location of a mobile communication device, etc.

User profiles 257 may include stored user preferences. User profiles 257 may include profiles for multiple users or may include a single profile for the system 100 in general. In some embodiments, a user is permitted to select which user profile of user profiles 257 is active via a user interface. In some embodiments, user profiles 357 may include preferences for customized ambient temperature control disclosed herein. The preferences could include customized temperature settings, such as one or more preferred temperatures linked with the particular user, temperature adjustments for certain scenarios such as an individual coming in from outdoors, an individual sitting, sleeping, other recent activity levels (e.g., person has been exercising) and/or physiological metrics (e.g., heart rate) known from one or more activity monitors and/or physiological sensors, an individual having just got out of the shower (e.g., known or assumed from person's location, a water heater starting to heat up an amount of water beyond a threshold, and/or a flow meter on a water line), an individual cooking (e.g., potentially known from electricity current drawn by a cooking device, gas flow to a gas hob, etc.), temperature adjustments contingent on outdoor temperature, and/or the like. The preferences could include precedence information that identifies which user profile should take precedence over one or more other user profiles (e.g., when multiple individuals are detected to be present in a particular location/room/zone, one individual's preference could be controlling in some embodiments). The user profiles 257 may further include user feedback received from the user regarding customizations. The feedback data may be used to refine the customizations for particular individuals and situations.

In some embodiments, the control engine 270 may include a matching engine 238. The matching engine 238 could use facial recognition to match data for an individual to image data 259 retained by the system to determine whether a sensed individual is known or a new individual. Captured occupant image data may be correlated to reference images 259 using any suitable facial trait qualifications for correlation. The matching engine 238 may link particular occupant image data to user profiles 257 with image data associated with individuals, to identify a known person or a new person.

The matching engine 238 may be configured to match information for an individual captured via the monitoring engine 236 to one or more categories from a set of categories 212. In some embodiments, the matching engine 238 can receive sensor data corresponding to one or more individuals, identify attributes of the one or more individuals based at least in part on the sensor data, and match the one or more individuals to one or more categories from a category information repository 212. Any suitable category may be employed to facilitate adjustment features in accordance various embodiments. By way of example, category information may include categories and corresponding criteria to qualify for particular categories such as remaining in a particular zone for one or more thresholds of time, remaining indoors for one or more thresholds of time, sitting, sleeping, high activity levels (e.g., which correspond to exercising), proximity to one or more air vents, located in a shower/bath, proximity to a cooking device, and/or the like.

The one or more storage repositories 225 may include rules 258. In some embodiments, the rules 258 may include criteria for matching a set of indicia of individual state to a set of one or more categories. In some embodiments, the rules 258 may include criteria for matching a set of one or more categories to a set of one or more HVAC adjustments. In some embodiments, rules 258 may include one or more rules for matching a set of one or more facial features of a detected individual to a set of one or more temperature control adjustments. In some embodiments, the rules 258 may include one or more arbitration rules for handling situations of multiple individuals, as disclosed further herein.

Some embodiments may allow for matching detected individuals with other individuals. For example, if it is determined that one or more of the individual characteristics do not match characteristics associated with one or more categories, it may be determined whether one or more of the characteristics match another already categorized individual. The one or more characteristics can be compared with those of another individual. If characteristics matched with a second individual satisfy a threshold, the individual can be determined to match with the category of the second individual. Then, the individual can be associated with the category of the second individual.

The system control engine 270 may include an adjustment engine 240 which may be configured to cause one or more HVAC adjustments. The adjustment engine 240 may analyze input monitored by the monitoring engine 236, determinations of the matching engine 238, and/or information stored in one or more repositories 225 to make adjustment determinations.

Based at least in part on one or more adjustment determinations, the adjustment engine 240 may cause activation of one or more adjustment actions. Such actions may include any one or combination of: activating or deactivating a heating system 282; activating or deactivating a cooling system 284; changing a thermostat setting or other like threshold 286; activating or deactivating another type of ventilation system 288, such as a fan, an attic fan, etc.; adjusting one or more air vents 290; making other adjustments 292 and/or the like. In various embodiments, other adjustments 292 may include any other suitable actions to facilitate temperature control.

Figure 3:
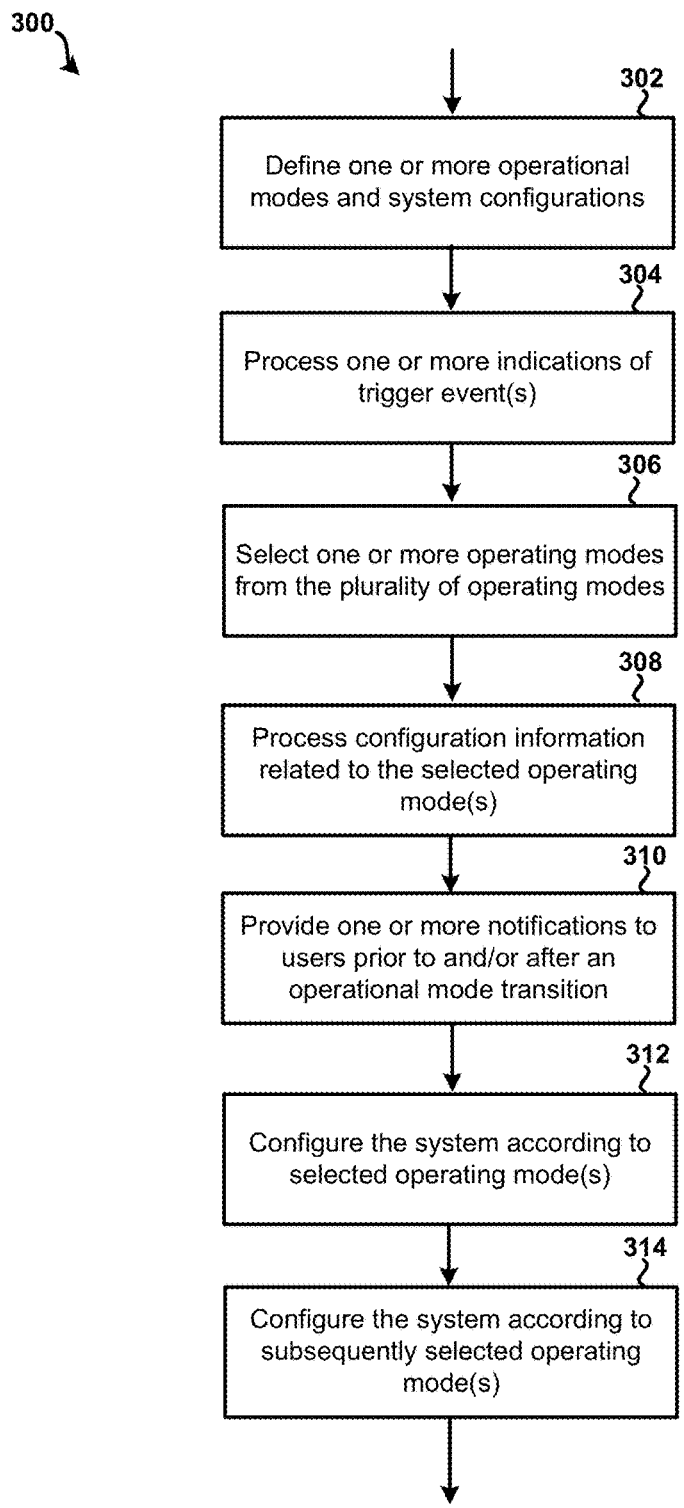
FIG. 3 illustrates an example method for enabling ambient temperature control, in accordance with certain embodiments of the present disclosure.

FIG. 3 illustrates an example method 300 for enabling ambient temperature control, in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 302, in some embodiments, one or more operational modes and system configurations may be defined. The one or more operational modes may include any suitable number of modes for any suitable system configurations, which may have any suitable number and type of system controllers, monitoring/control modules, notification interfaces, sensors, device controllers, and devices under control. The end user could have the option to define and/or select one or more operational modes via interfaces and controllers in some embodiments. In some embodiments, the controllers may be preset by, say a manufacturer and/or service provider, with the one or more operational modes. In some embodiments, the controllers may be configured to automatically define one or more operational modes based at least in part on detecting the particular type of device under control coupled to the device controller.

As indicated by block 304, the system controller may process an indication of a trigger event. The trigger event may correspond to one or more adjustment inputs. As indicated by block 306, the system controller may select an operating mode from the plurality of operating modes based at least in part on the indication of the trigger event.

As indicated by block 308, the configuration information related to the selected operating mode(s) may be processed by any one or combination of the system controller, monitoring/control modules, and/or device controller(s). The configuration information could include information about a set of one or more devices under control for the system, a set of one or more corresponding device controllers, a set of one or more corresponding communications, and/or the like. By way of example, the configuration information could include information about certain devices under control that can be turned on, turned off, or otherwise controlled.

In some embodiments, as indicated by block 310, the system may provide one or more notifications to users prior to and/or after an operational mode transition to inform the user of the change. Notifications may be presented via notification interfaces. A notification could be provided for all changes or for only select changes.

As indicated by block 312, the system may be configured according to the selected operating mode(s). As indicated by block 314, the system may be configured according to a second operating mode. The second operating mode may correspond to the initial, default, and/or normal operating mode such that the television receiver returns to the former state that it was in. In some embodiments, the second set of operating mode(s) may correspond to another operating mode, and any one or combination of steps 302 to 310 may be performed with respect to the second set of operating mode(s). The second set of operating mode(s) could be selected based at least in part on dynamic adjustment in view of monitored adjustment input.

Figure 4:
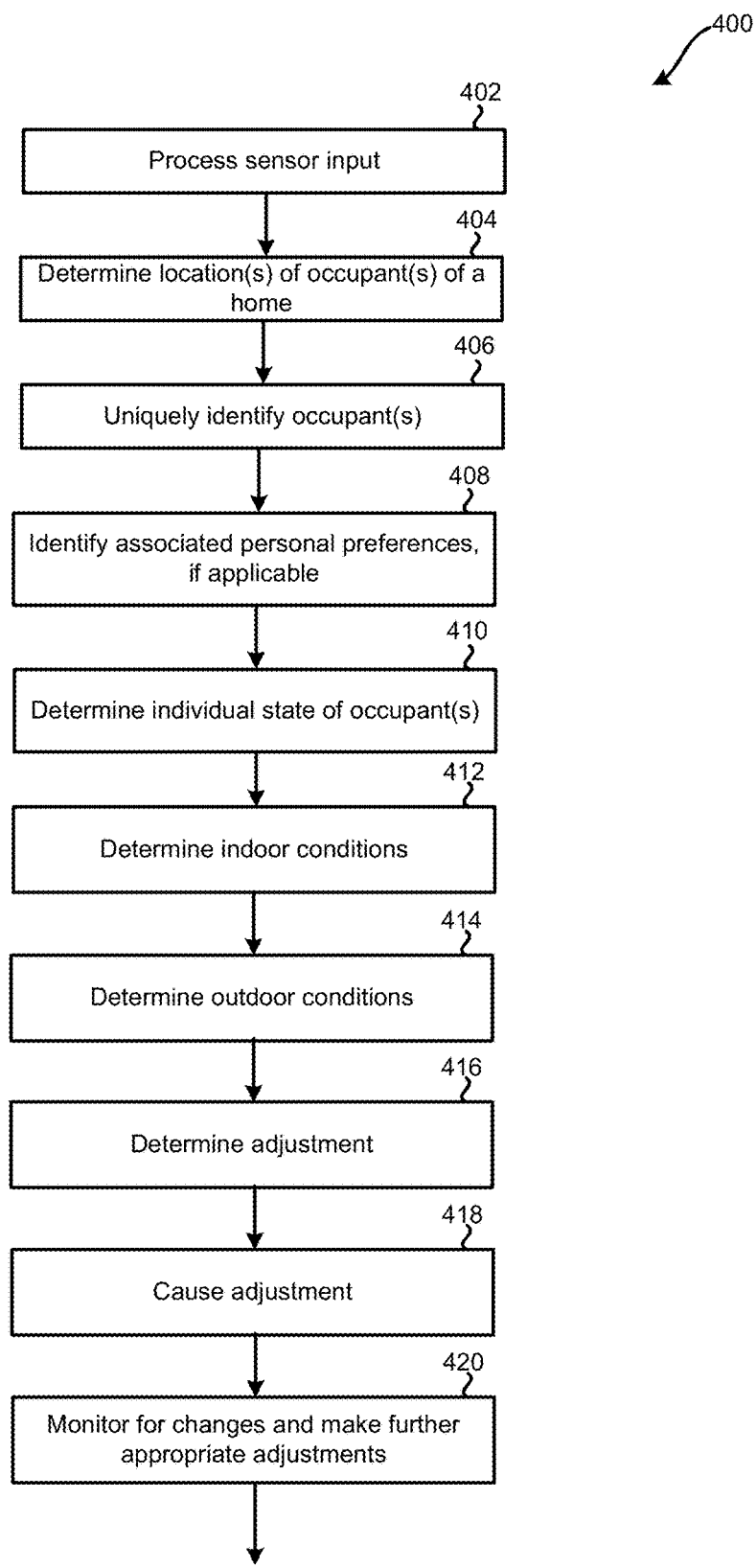
FIG. 4 illustrates an example method for enabling ambient temperature control, in accordance with certain embodiments of the present disclosure.

Further aspects of various embodiments are illustrated in reference to FIG. 4. FIG. 4 illustrates an example method 400 for enabling ambient temperature control, in accordance with certain embodiments of the present disclosure. As indicated by block 402, sensor input may be processed. As disclosed herein, the sensor input may include indicia of one or more locations of one or more occupants of a home. For example, in various embodiments, input may be gathered from location-detecting sensors such as motion sensors, cameras, light sensors, smartphones, third-party data sources, and/or the like.

As indicated by block 404, one or more locations of one or more occupants may be determined based at least in part on sensor input. Various embodiments may allow for varying degrees of location identification. In some embodiments, the determination of a location of an occupant may be relegated to generally detecting an occupant within a home. Other embodiments may detect occupant location with more specificity. For example, certain embodiments may determine an occupant is in a particular level of the home, room of a home, part of a room, etc.

As indicated by block 406, in some embodiments, one or more occupants may be uniquely identified. In some embodiments, occupants may be identified based on facial recognition. In some embodiments, occupants may be identified by other bodily characteristics, such as size. In some embodiments, an occupant may be identified based on a mobile communication device on or about the person.

As indicated by block 408, preferences may be identified for the occupant. The preferences could correspond to user input, currently received or previously acquired. As disclosed herein, one or more user profiles may be processed to identify preferences for customized ambient temperature control. The preferences could include customized temperature settings, such as one or more preferred temperatures linked with the particular user, temperature adjustments for certain scenarios. In some embodiments, preferences may be assumed for an occupant. For example, one or more default user profiles may be utilized, and then customized per user feedback.

As indicated by block 410, an individual state of an occupant may be determined. In some embodiments, sensor input may be analyzed to determine whether the individual has remained indoors for one or more thresholds of time, or more specifically in a particular zone for one or more thresholds of time.

In some embodiments, sensor input may be analyzed to determine whether an individual has recently come indoors. For example, the sensor input could include input from a door opening/closing detector. In some embodiments, the system could be implemented in conjunction with a home security system which could include door detectors, movement detectors, and window detectors, any one or combination of which could be used to provide sensor input. In some embodiments, smartphone/mobile phone location detection discussed herein may be used to facilitate determination of whether an individual has recently come indoors. In some embodiments, a motion and/or light detection sensor, camera, and/or the like may be configured to capture instances of ingress.

In some embodiments, sensor input may be analyzed to determine whether an individual is sitting, sleeping, reclining, exercising, standing, and/or the like. Further, certain embodiments may determine that the occupant is proximate to one or more sources of heat or cold. In some embodiments, it may be determined whether an individual is proximate to one or more cooking devices in a kitchen. In some embodiments, the one or more cooking device may be detected to be operating via localized heat sensing and/or electric current sensing. In some embodiments, it may be determined whether an individual is proximate to one or more air vents. A set of embodiments may include determining whether an individual is proximate to another source of heat or cool air (e.g., windows, doors, lights, appliances, and/or the like). Distance between the individual and an air vent may be estimated with certain embodiments. In some embodiments may determine whether an individual is within a certain distance range, based on one or more distance thresholds, with respect to an air vent.

As indicated by block 412, one or more indoor conditions may be identified. Indoor conditions may be specific to the particular room and/or zone in which an occupant is detected. Indoor conditions could include any one combination of detected temperature, humidity, activity and/or settings of HVAC components, air vents, shades, lines, light sources, heat sources, cold sources, and/or the like. Accordingly, conditions may be assessed in a particular area proximate to an occupant, not just in one area for the whole home.

As indicated by block 414, one or more outdoor conditions may be identified. In various embodiments, temperature adjustments may be based at least in part on outdoor conditions. For example, different temperature adjustments may be identified for an individual coming from outdoor conditions that satisfy one or more thresholds (e.g., for high temperatures, low temperatures, wind chills, humidity, etc.). Hence, greater cooling adjustments (initial and/or steady-state) may be determined to be appropriate for an individual coming from summertime conditions with high temperatures beyond one or more thresholds to cool off and to accommodate relatively light summertime clothing. Conversely, greater heating adjustments (initial and/or steady-state) may be determined to be appropriate for an individual coming from wintertime conditions with low temperatures below one or more thresholds to warm up and to accommodate relatively heavy wintertime clothing. And, generally, different steady-state temperatures may be determined as appropriate depending on outdoor conditions. For example, it is not uncommon for a first temperature to be deemed comfortable by an individual during summertime and a second temperature to begin comfortable by the same individual during wintertime.

Outdoor conditions may be gathered from sensors and/or network-accessible data sources. In some embodiments, a service provider or other data source may push indications of local outdoor conditions to the system. Alternatively or additionally, the system may pull indications of local outdoor conditions from a service provider or other data source.

As indicated by block 416, one or more adjustments may be determined based at least in part on any one or combination of the foregoing factors under the like. For example, a particular adjustment may be determined appropriate if an occupant remains in a particular location for a particular threshold of time; however, in some cases, no adjustment may be determined appropriate if the occupant does not remain in the particular location (say, a particular room) for minimum amount of time.

In some situations, a first adjustment may be made for an initial time period after an individual has entered a particular location, and a second adjustment may be made after the individual has remained in a particular location for one or more additional time periods. Thus, certain embodiments may allow for initial adjustments and steady-state adjustments. For example, an individual coming in from the outdoors during summertime may be determined to have need of an initial cooling-off period, requiring activation of air conditioning, a greater degree of activation, lowering of the thermostat setting, focusing of air vents to a particular zone where the individuals is located, and/or the like. In certain scenarios (e.g., where the individual is the only one occupying a home at the time), air vents in the occupied zone could be activated to be fully open, and air vents in the unoccupied zones could be activated to be fully closed in order to focus temperature control toward the occupied zone. Such adjustments could be made when there is more than one occupant (e.g., only closing vents of unoccupied zones, only partially closing vents of an occupied zone, etc.).

After a certain initial adjustment, a second adjustment may be made to accommodate the steady-state situation of an individual having become acclimated to the ambient temperature. A particular adjustment may be made based on the state of the occupant. For example, a particular adjustment may be determined appropriate for an occupant that has been sitting for a certain time period. Another adjustment may be determined appropriate for an occupant that has been reclining and/or sleeping for a certain time period. Yet another adjustment may be determined appropriate for an occupant that has been highly active for a certain time period (e.g., house cleaning, exercising, etc.) and/or has one or more thresholds of heart rates for a certain time period.

As indicated by block 418, one or more adjustments may be caused by the system. For example, a heating/cooling/ventilation system may be activated, deactivated, or otherwise adjusted; a thermostat setting or other like threshold may be changed; one or more air vents, windows, blinds, shades, etc. may be adjusted; one or more user notifications may be generated; and/or the like.

As indicated by block 420, changes in the location of the occupant, occupant state, user input, indoor conditions, outdoor conditions, and/or the like may be monitored, and further adjustment may be determined and effected. By way of example, ambient temperature near the occupant may be monitored to ensure progression towards a target temperature. The target temperature could be specified by user preference. In some cases, progression may be monitored to ensure that the target temperature is reached within a minimum amount of time. If the progression is determined to be too slow (e.g., the target temperature is not reached within a particular time period), further adjustment may be made to facilitate reaching of the target temperature. Thus, certain embodiments may allow for escalated adjustments in order to reach a target temperature. For example, a first stage adjustment may correspond to activation of an HVAC system, and a second stage adjustment may correspond to adjustment of air vents to focus heating or cooling on the occupant.

Occupant actions may be monitored as responses to adjustments. Occupant actions may be monitored for implicit indicia of preferences. For example, it may be determined whether the occupant makes a temperature adjustment, in essence correcting the system-determined adjustment. Such implicit user feedback may be taken into account by the system to learn user preferences. Accordingly, the system may adjust one or more user profiles based on such feedback.

Explicit indicia of occupant preferences may be monitored. In some embodiments, occupants may be presented with options for providing feedback on adjustments. For example, one or more user-selectable options may be provided via the notification interface(s) to rate adjustments, change adjustments, or otherwise indicate preferences and/or define operating modes.

Figure 5:
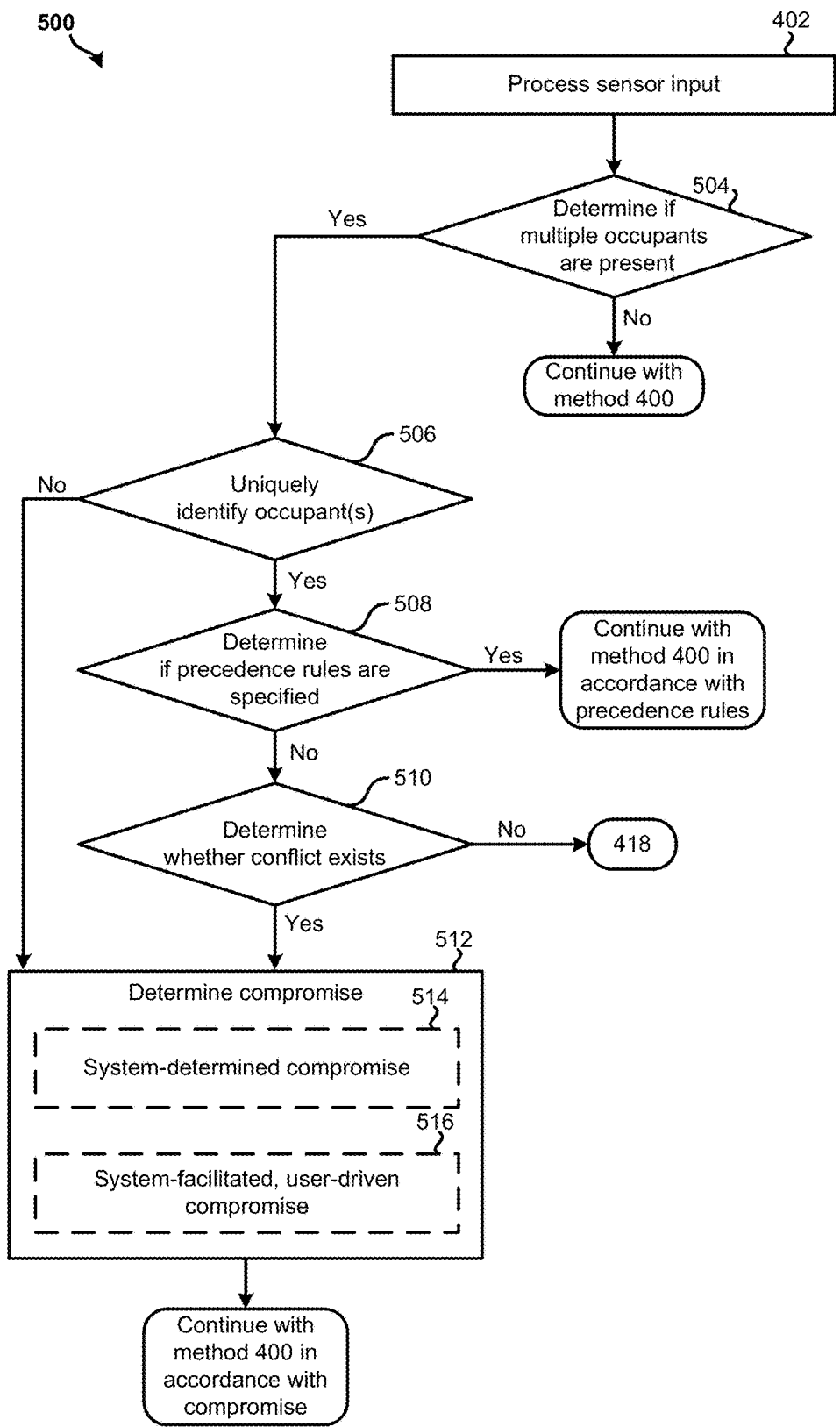
FIG. 5 is a block diagram that illustrates an example method of certain features directed to tailoring adjustments based on multiple-occupant situations, in accordance with certain embodiments of the present disclosure.

FIG. 5 is a block diagram that illustrates an example method 500 of certain features directed to tailoring adjustments based on multiple-occupant situations, in accordance with certain embodiments of the present disclosure. According to certain embodiments, the method 500 may begin as indicated by block 402 of method 400 by gathering sensor data relating to one or more occupants. As indicated by block 504, it may be determined if multiple occupants are present. In the case that only one occupant is present, the process may flow back to any suitable step of method 400. However, if it is determined that multiple occupants are present, flow may proceed to block 506.

In some embodiments, as indicated by block 506, one or more of the occupants may be uniquely identified as disclosed herein. If one or more of the occupants are uniquely identified, flow may transition to block 508; if not, the flow may transition to block 510.

As indicated by block 508, in some embodiments, it may be determined whether any precedence rules are specified by one or more user profiles. User-specified preferences could include precedence information that identifies which user profile should take precedence over one or more other user profiles. If precedence rules are specified by one or more user profiles, a controlling user profile may be determined based on the precedence rules, and the process may flow back to any suitable step of method 400 to continue in accordance with the preferences of the controlling user profile.

As indicated by block 510, in some embodiments, it may be determined whether a conflict exists as between the occupants. For example, method 400 may proceed with respect to two or more occupants, considering any one or combination of the various factors discussed with respect to the occupants. In some embodiments, if two or more different adjustments are determined individually with respect to the two or more occupants and both adjustments cannot be implemented simultaneously by the system (e.g., adjustments correspond to different target temperatures for the same particular zone), a conflict may be considered to exist, and the process flow may transition to block 512. However, if method 400 proceeds to determine that the same adjustment is appropriate for all the occupants or if multiple different adjustments can be implemented simultaneously by the system (e.g., adjustments correspond to different zones that can be regulated differently by air vent control and/or the like), then no conflict exists in process flow may transition to block 418 of method 400 to make the adjustments.

As indicated by block 512, a compromise may be determined. In some embodiments, as indicated by block 514, the system may determine a compromise. A system-determined compromise may include any one or combination of determining an average temperature adjustment, a least means square algorithm, and/or the like based at least in part on individual adjustments/target temperatures for the multiple occupants. With some embodiments, the method 400 may continue with the system-determined compromise.

In some embodiments, as indicated by block 516, the system may facilitate a compromise that is driven by the occupants. In some embodiments, arbitration rules may provide for providing a suggestion of a compromise adjustment to the occupants with one or more user-selectable options presented via one or more notification interfaces. The compromise adjustment may be determined in any suitable manner, such as the aforementioned system-determined compromise. With some embodiments, the method 400 may continue with the compromise adjustment if a corresponding user selection to accept the adjustment is received.

In some embodiments, arbitration rules may provide for soliciting input (e.g., votes or other user input) for target temperatures from the occupants with one or more user-selectable options presented via one or more notification interfaces. The system may use the feedback in determining an average temperature adjustment, a least means square algorithm, and/or the like. With some embodiments, the system may wait for input for a particular period of time and then act on any input received.

With some embodiments, the system may dynamically adjust each time input is received. Thus, for example, the method 400 may continue with a first adjustment based on a first user input. As additional user input is received, the system may determine a second compromise adjustment in view of the additional user input, and the method 400 may continue with the second compromise adjustment. Such a process of dynamically determining compromise adjustments may continue as additional user input is received from additional occupants.

Figure 6:
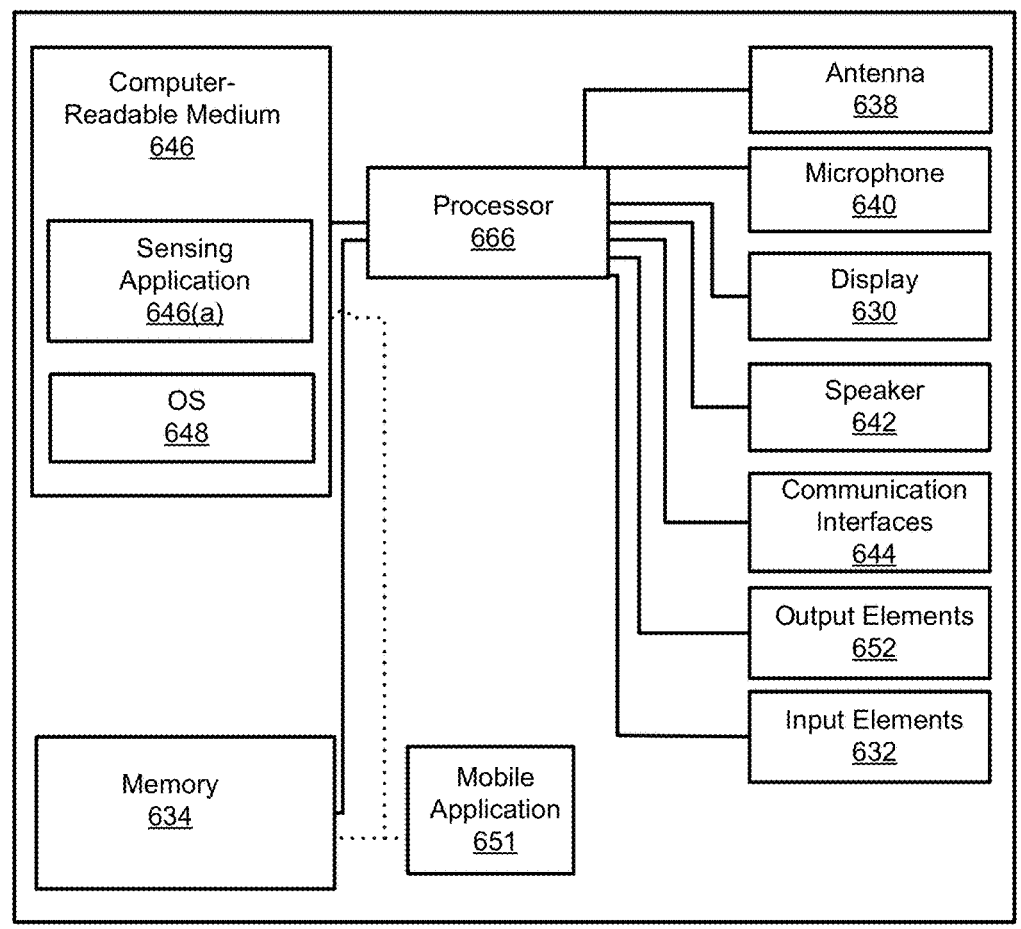
FIG. 6 is a functional block diagram of a computing device, according to certain embodiments of the present disclosure.

FIG. 6 is a functional block diagram of a computing device 600, which may correspond to one or more of controllers 170, modules 140, and/or notification interfaces 116, according to certain embodiments of the present disclosure. In some embodiments, the computing device 600 may be mobile computing device. In some embodiments, the computing device 600 may be provided with a mobile application 651 configured to run on the computing device 600 to facilitate various embodiments of this disclosure. In some embodiments, instead of a mobile application 651, another type of application or instruction set may be configured to run on the computing device 600 to facilitate various embodiments of this disclosure. The computing device 600 may be any portable device suitable for sending and receiving information in accordance with embodiments described herein. For example without limitation, in various embodiments, the computing device 600 may include one or more of a mountable control unit, a mobile phone, a cellular telephone, a smartphone, a handheld mobile device, a tablet computer, a web pad, a personal digital assistant (PDA), a notebook computer, a handheld computer, a laptop computer, a wearable computing device (e.g., smart watch, smart glasses, etc.) or the like.

As shown in FIG. 6, the computing device 600 includes a display 630 and input elements 632 to allow a user to input information into the computing device 600. By way of example without limitation, the input elements 632 may include one or more of a keypad, a trackball, a touchscreen, a touchpad, a pointing device, a microphone, a voice recognition device, or any other appropriate mechanism for the user to provide input. The display 630 may include a resistive or capacitive screen. The display 630 may be configured for stylus sensitivity which allows movement of the stylus on the screen to be detected. The touch-screen capability may be achieved via an electronic position location system capable of determining a location of a selected region of the display screen. A commercially available electronic position location system like the ones that are used in many commercially available devices such as personal digital assistants, tablet PCs, and smartphones, may be used.

The input elements 632 may include one or more of: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The input elements 632 may include a set of one or more of physiological sensors. For example, the set of physiological sensors may include any one or combination of bioimpedance, respiration, respiration rate variability, heart rate (average, minimum, maximum), heart rhythm, heart rate variability, respiratory sounds, blood pressure, activity, posture, and/or temperature/heat flux. The input elements 632 may include an activity sensor that may be one or more of the following: ball switch, accelerometer, heart rate, bioimpedance noise, skin temperature/heat flux, blood pressure, muscle noise, posture. In some embodiments, heart rate or other physiological aspects may be detected in conjunction with the flash of the camera. For example, a consumer could place his finger over the flash so that heart rate may be detected.

The computing device 600 includes a memory 634 communicatively coupled to a processor 636 (e.g., a microprocessor) for processing the functions of the computing device 600. The computing device 600 may include at least one antenna 638 for wireless data transfer. The computing device 600 may also include a microphone 640 to allow a user to transmit voice communication through the computing device 600, and a speaker 642 to allow the user to hear alarms, voice communication, music, etc. In addition, the computing device 600 may include one or more interfaces in addition to the antenna 638, e.g., a wireless interface coupled to an antenna. The communications interfaces 644 can provide a near field communication interface (e.g., contactless interface, Bluetooth, Zigbee, optical interface, etc.) and/or wireless communications interfaces capable of communicating through a cellular network, such as GSM, or through Wi-Fi, such as with a wireless local area network (WLAN). Accordingly, the computing device 600 may be capable of transmitting and receiving information wirelessly through both short range, radio frequency (RF) and cellular and Wi-Fi connections.

The computing device 600 can also include at least one computer-readable medium 646 coupled to the processor 636, which stores application programs and other computer code instructions for operating the device, such as an operating system (OS) 648. The mobile application 651 may be stored in the memory 634 and/or computer-readable media 646. In certain embodiments, the computing device 600 may include a non-transitory computer-readable storage medium, e.g., memory 634. The computer-readable medium 646 can include a sensing application 646(*a*) to gather and/or process any suitable information regarding sensors (e.g., temperature, light, etc.) in accordance with various embodiments, including, for example, data gathered from sensors of the computing device 600.

Figure 7:
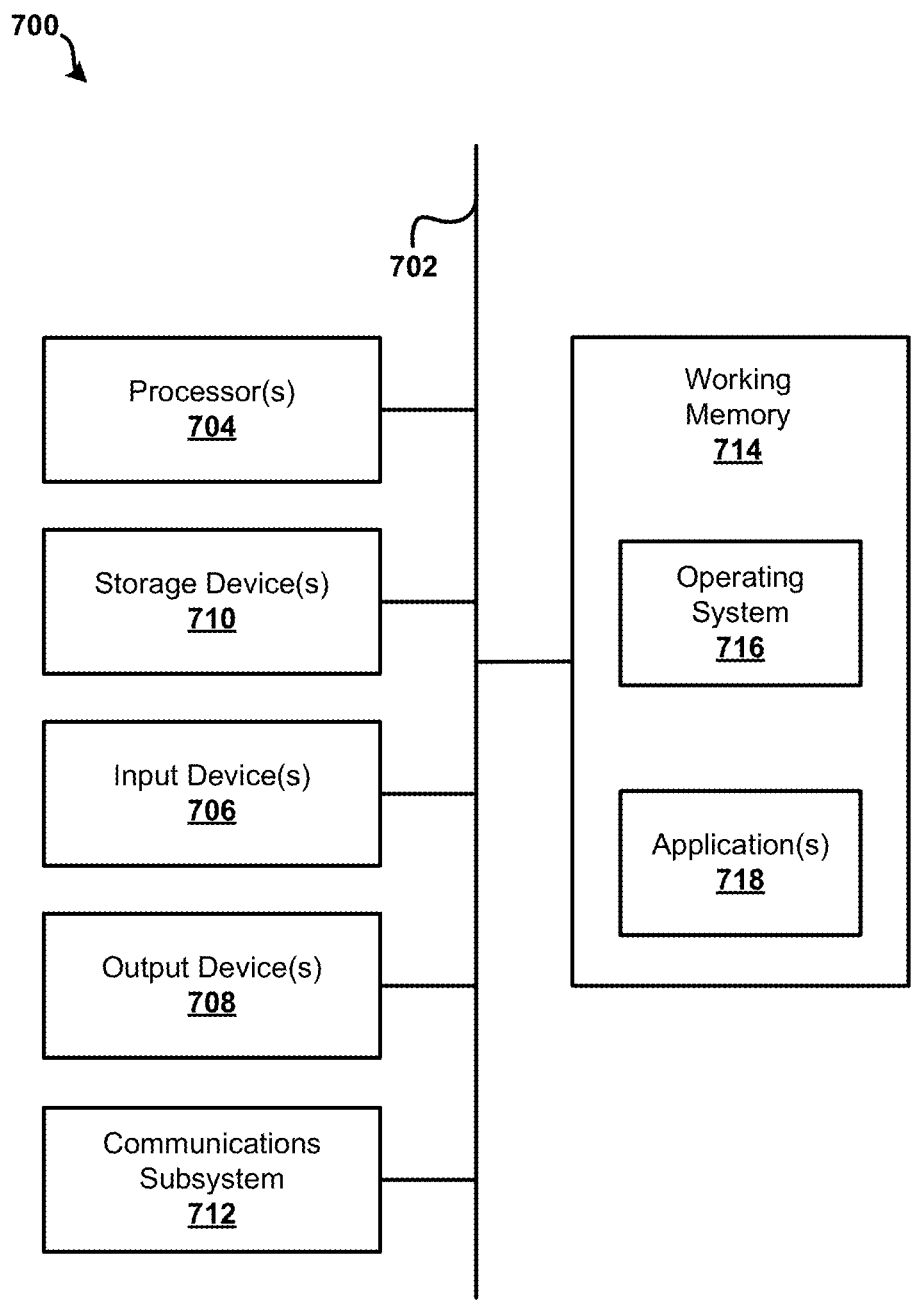
FIG. 7 illustrates a schematic illustration of a computer system, according to certain embodiments of the present disclosure.

A computer system as illustrated in FIG. 7 may be incorporated as part of the previously described computerized devices. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 702.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 835 from another computer-readable medium, such as one or more of the non-transitory storage device(s) 825. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automation control for personalized ambient temperature management, the method comprising:
    receiving, by a control device, first input from a first set of one or more sensors communicatively coupled to the control device, consequent to the first set of one or more sensors detecting indicia of a presence of an occupant in and/or about a home, where the first input corresponds to the detected indicia of the presence of the occupant;
    processing, by the control device, the first input from the first set of one or more sensors to determine a location of the occupant in the home based at least in part on the first input;
    receiving, by the control device, second input from a second set of one or more sensors communicatively coupled to the control device, consequent to the second set of one or more sensors detecting indicia of temperature corresponding to the location;
    processing, by the control device, the second input from the second set of one or more sensors to determine a temperature in the location based at least in part on the second input;
    analyzing, by the control device, third input from the first set of one or more sensors or from a third set of one or more sensors to determine a state of the occupant in the location based at least in part on the third input, the state of the occupant corresponding to an activity of the occupant in the location for at least a threshold period of time;
    determining, by the control device, an initial adjustment and a steady-state adjustment based at least in part on the location, the determined temperature, and the state of the occupant, the initial adjustment and the steady-state adjustment corresponding to activating, deactivating, and/or changing a setting of one or more devices under control in the home to cause at least two changes in temperature;
    causing, by the control device, the one or more devices under control to activate, deactivate, and/or change the setting in accordance with the initial adjustment for an initial time period; and
    causing, by the control device, the one or more devices under control to activate, deactivate, and/or change the setting in accordance with the steady-state adjustment after initial time period.

2. The method for automation control for personalized ambient temperature management of claim 1, further comprising:
    identifying, by the control device, one or more preferences associated with the occupant;
    wherein at least one of the initial adjustment and the steady-state adjustment is determined to meet user constraints based at least in part on the one or more preferences.

3. The method for automation control for personalized ambient temperature management of claim 1, further comprising:
    identifying, by the control device, a presence of a second occupant of the home;
    wherein the determining of the initial adjustment and/or the steady-state adjustment is based in part on the presence of the second occupant and a set of rules for multi-occupant situations.

4. The method for automation control for personalized ambient temperature management of claim 3, further comprising:
    causing, by the control device, presentation of one or more user-selection options via one or more notification interfaces; and
    processing, by the control device, one or more user selections corresponding to the one or more user-selection options;
    wherein the determining of the initial adjustment and/or the steady-state adjustment is based in part on the one or more user selections.

5. The method for automation control for personalized ambient temperature management of claim 4, wherein a plurality of user selections are processed, the plurality of user selections corresponding to votes from a plurality of occupants comprising the occupant and the second occupant, the method further comprising:
    determining, by the control device, a compromise based at least in part on the votes;

wherein the determining of the initial adjustment and/or the steady-state adjustment is based in part on the compromise.

6. The method for automation control for personalized ambient temperature management of claim 1, further comprising:
determining, by the control device, one or more outdoor conditions;
wherein the determining of the initial adjustment and/or the steady-state adjustment is based in part on the one or more outdoor conditions.

7. The method for automation control for personalized ambient temperature management of claim 1, wherein the state of the occupant in the location comprises a proximity to a heat source or a heat sink.

8. A system for automation control for personalized ambient temperature management, the system comprising:
a control device configured to communicatively couple to a first set of one or more sensors, a second set of one or more sensors, and one or more components of a home, the control device comprising:
one or more processors; and
a memory communicatively coupled with and readable by the one or more processors and having stored therein processor-readable instructions which, when executed by the one or more processors, cause the one or more processors to:
process first input from to the first set of one or more sensors communicatively coupled to the control device, consequent to the first set of one or more sensors detecting indicia of a presence of an occupant in and/or about a home, where the first input corresponds to the detected indicia of the presence of the occupant;
determine a location of the occupant in the home based at least in part on the first input from the first set of one or more sensors;
process second input from the second set of one or more sensors communicatively coupled to the control device, consequent to the second set of one or more sensors detecting indicia of temperature corresponding to the location;
determine a temperature in the location based at least in part on the second input from the second set of one or more sensors;
analyze third input from the first set of one or more sensors or from a third set of one or more sensors to determine a state of the occupant in the location based at least in part on the third input, the state of the occupant corresponding to an activity of the occupant in the location for at least a threshold period of time;
determine an initial adjustment and a steady-state adjustment based at least in part on the location, the determined temperature, and the first state of the occupant, the initial adjustment and the steady-state adjustment corresponding to activating, deactivating, and/or changing a setting of one or more devices under control in the home to cause at least two changes in temperature;
cause the one or more devices under control to activate, deactivate, and/or change the setting in accordance with the initial adjustment for an initial time period; and cause the one or more devices under control to activate, deactivate, and/or change the setting in accordance with the steady-state adjustment after initial time period.

9. The system for automation control for personalized ambient temperature management of claim 8, wherein the processor-readable instructions further cause the one or more processors to:
identify one or more preferences associated with the occupant;
wherein at least one of the initial adjustment and the steady-state adjustment is determined to meet user constraints based at least in part on the one or more preferences.

10. The system for automation control for personalized ambient temperature management of claim 8, wherein the processor-readable instructions further cause the one or more processors to:
identify a presence of a second occupant of the home;
wherein the determining of the initial adjustment and/or the steady-state adjustment is based in part on the presence of the second occupant and a set of rules for multi-occupant situations.

11. The system for automation control for personalized ambient temperature management of claim 10, wherein the processor-readable instructions further cause the one or more processors to:
cause presentation of one or more user-selection options via one or more notification interfaces; and
process one or more user selections corresponding to the one or more user-selection options;
wherein the determining of the initial adjustment and/or the steady-state adjustment is based in part on the one or more user selections.

12. The system for automation control for personalized ambient temperature management of claim 8, wherein the processor-readable instructions further cause the one or more processors to:
determine one or more outdoor conditions;
wherein the determining of the initial adjustment and/or the steady-state adjustment is based in part on the one or more outdoor conditions.

13. The system for automation control for personalized ambient temperature management of claim 8, wherein the state of the occupant in the location comprises a proximity to a heat source or a heat sink.

14. One or more non-transitory, machine-readable media having machine-readable instructions thereon which, when executed by one or more processing devices, facilitates automation control for personalized ambient temperature management, causing the one or more processing devices to:
process first input from to a first set of one or more sensors, consequent to the first set of one or more sensors detecting indicia of a presence of an occupant in and/or about a home, where the first input corresponds to the detected indicia of the presence of the occupant;
determine a location of the occupant in the home based at least in part on the first input from the first set of one or more sensors;
process second input from a second set of one or more sensors, consequent to the second set of one or more sensors detecting indicia of temperature corresponding to the location;
determine a temperature in the location based at least in part on the second input from the second set of one or more sensors;

analyze third input from the first set of one or more sensors or from a third set of one or more sensors to determine a state of the occupant in the location based at least in part on the third input, the state of the occupant corresponding to an activity of the occupant in the location for at least a threshold period of time;

determine an initial adjustment and a steady-state adjustment based at least in part on the location, the determined temperature, and the state of the occupant, the initial adjustment and the steady-state adjustment corresponding to activating, deactivating, and/or changing a setting of one or more devices under control in the home to cause at least two changes in temperature;

cause the one or more devices under control to activate, deactivate, and/or change the setting in accordance with the initial adjustment for an initial time period; and cause the one or more devices under control to activate, deactivate, and/or change the setting in accordance with the steady-state adjustment after initial time period.

15. The one or more non-transitory, machine-readable media of claim 14, wherein the machine-readable instructions further cause the one or more processing devices to:
identify one or more preferences associated with the occupant;
wherein at least one of the initial adjustment and the steady-state adjustment is determined to meet user constraints based at least in part on the one or more preferences.

16. The one or more non-transitory, machine-readable media of claim 14, wherein the machine-readable instructions further cause the one or more processing devices to:
identify a presence of a second occupant of the home;
wherein the determining of the initial adjustment and/or the steady-state adjustment is based in part on the presence of the second occupant and a set of rules for multi-occupant situations.

17. The one or more non-transitory, machine-readable media of claim 16, wherein the machine-readable instructions further cause the one or more processing devices to:
cause presentation of one or more user-selection options via one or more notification interfaces; and
process one or more user selections corresponding to the one or more user-selection options;
wherein the determining of the initial adjustment and/or the steady-state adjustment is based in part on the one or more user selections.

* * * * *

UNITED STATES PATENT AND TRADEMARK OFFICE
CERTIFICATE OF CORRECTION

PATENT NO. : 9,900,173 B2  
APPLICATION NO. : 14/459517  
DATED : February 20, 2018  
INVENTOR(S) : David Robinson Page 1 of 1

It is certified that error appears in the above-identified patent and that said Letters Patent is hereby corrected as shown below:

In the Claims

Column 21, Line 29, Claim 8, please delete "to"

Column 21, Line 58, Claim 8, please delete "first"

Column 22, Line 52, Claim 14, please delete "to"

Signed and Sealed this  
Thirteenth Day of November, 2018

Andrei Iancu  
*Director of the United States Patent and Trademark Office*